United States Patent
Oh et al.

(10) Patent No.: US 8,952,990 B2
(45) Date of Patent: Feb. 10, 2015

(54) METHOD FOR PROCESSING INTERACTION BETWEEN USER AND HOLOGRAM USING VOLUMETRIC DATA TYPE OBJECT WAVE FIELD

(71) Applicant: Electronics and Telecommunications Research Institute, Daejeon (KR)

(72) Inventors: Seung Taik Oh, Daejeon (KR); Wook Ho Son, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 171 days.

(21) Appl. No.: 13/767,811

(22) Filed: Feb. 14, 2013

(65) Prior Publication Data

US 2013/0208010 A1 Aug. 15, 2013

(30) Foreign Application Priority Data

Feb. 15, 2012 (KR) .................. 10-2012-0015289

(51) Int. Cl.
*G09G 5/00* (2006.01)
*G06T 3/00* (2006.01)
*G03H 1/00* (2006.01)
*G03H 1/22* (2006.01)

(52) U.S. Cl.
CPC .............. *G06T 3/00* (2013.01); *G03H 1/0005* (2013.01); *G03H 1/2294* (2013.01); *G03H 2001/0061* (2013.01); *G03H 2210/441* (2013.01)

USPC .......................................... 345/645

(58) Field of Classification Search
None
See application file for complete search history.

(56) References Cited

U.S. PATENT DOCUMENTS

| 6,211,848 | B1 | 4/2001 | Plesniak et al. | |
| 2008/0231926 | A1* | 9/2008 | Klug et al. | 359/23 |
| 2009/0108215 | A1* | 4/2009 | Moon | 250/492.22 |
| 2012/0113223 | A1* | 5/2012 | Hilliges et al. | 348/46 |

FOREIGN PATENT DOCUMENTS

KR 20-0448452 Y1 4/2010

\* cited by examiner

*Primary Examiner* — Xiao Wu
*Assistant Examiner* — Yingchun He

(57) ABSTRACT

Disclosed is a method for processing interaction between a user and hologram using a volumetric data type object wave field. A method for processing interaction between a user and hologram for user's action using a volumetric data type object wave field includes: capturing user action on the holographic image of the object and solving collision between user and object; computing the updated position and rotation of the object by time integration of rigid body equation in collision; calculating the relative position and rotation of the hologram plane with respect to local object coordinates; transforming the hologram in the pre-computed volumetric object wave field grid according to the relative position and rotation of the hologram plane in local object coordinates and reading the object wave fields at all the pixels of the transformed hologram plane in order to generate a new hologram for the transformed object caused by user action.

5 Claims, 3 Drawing Sheets

METHOD FOR PROCESSING INTERACTION BETWEEN USER AND HOLOGRAM USING VOLUMETRIC DATA TYPE OBJECT WAVE FIELD

CROSS-REFERENCE TO RELATED APPLICATIONS

This application is based on and claims priority from Korean Patent Application No. 10-2011-0015289, filed on Feb. 15, 2012, with the Korean Intellectual Property Office, the disclosure of which is incorporated herein in its entirety by reference.

TECHNICAL FIELD

The present disclosure relates to a digital holography technology, and more particularly, to a method for processing interaction between a user and hologram using a volumetric data type object wave field.

BACKGROUND

Research and technical development of an interaction processing technology between a user and hologram is extremely deficient even in a hologram field. A hologram interaction technology using haptic equipment was first researched by MIT in 1999. In this technology, interaction in which a surface of revolution acquired through revolution is chamfered by using pen-type haptic equipment was possible. The surface of revolution is determined by a profile curve and using horizontal parallax only hologram which changes the profile curve through action of a pen and can be rapidly generated may be a core factor of the technology (W. Plesniak and R. Pappu, Spatial Interaction with Haptic Holograms, Proc. of IEEE International Conference on Multimedia Computing and Systems, 1999).

Thereafter, a hologram interaction technology developed in the Univ. of Tokyo as a title "Touchable holography" is introduced in the SIGGRAPH Academy in 2009. Herein, the technology is designed so that motion of user's hands is calculated by using a camera and force is transferred to the user's hand by using ultrasonic waves at the time of collision with a holographic image (SIGGRAPH 2009 Emerging Technologies).

However, both technologies include a disadvantage that simple motion changes of object in position and rotation caused by user interaction cannot be handled.

SUMMARY

The present disclosure has been made in an effort to provide a method for processing interaction between a user and hologram, more precisely, holographic image using a volumetric data type object wave field as a hologram interaction technology in which an object can be rigidly moved.

An exemplary embodiment of the present disclosure provides a method for processing interaction between a user and hologram for user's action using a volumetric data type object wave field, the method including: capturing user action on the holographic image of the object and solving collision between user and object; computing the updated position and rotation of the object by time integration of rigid body equation in collision; calculating the relative position and rotation of the hologram plane with respect to local object coordinates; transforming the hologram in the pre-computed volumetric object wave field grid according to the relative position and rotation of the hologram plane in local object coordinates and reading the object wave fields at all the pixels of the transformed hologram plane in order to generate a new hologram for the transformed object caused by user action.

Effects of the present disclosure are as follows. Interaction between a user and a holographic image is enabled, in which basic rigid-body transformations such as translation and rotation are enabled. An object wave can be expressed as volumetric data defined in an entire space, and as a result, regeneration of hologram by positional and rotational change of an object can be performed very rapidly.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
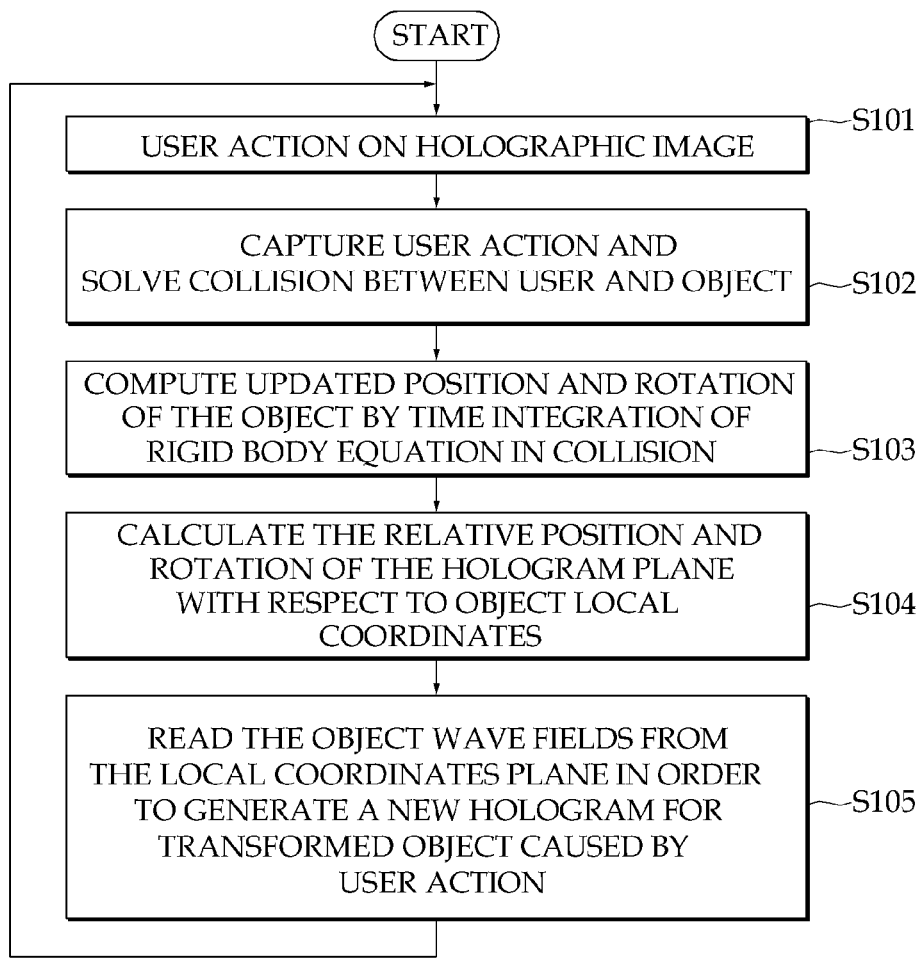
FIG. 1 is a flowchart illustrating an interaction processing procedure between a user and hologram according to an exemplary embodiment of the present disclosure.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

The present disclosure proposes a method for processing interaction between a user and a holographic image. The interaction between the user and the hologram image means that an image reproduced by the hologram reacts like an actual object by force transferred by the user. For realistic interaction between the user and the hologram, generation of real-time hologram that rapidly reacts to the user's action is required.

Therefore, the present disclosure intends to propose a method for performing reflection of the hologram to positional and rotational changes of the object which are occurred by the interaction in real time by modeling the object wave in the entire space. Meanwhile, in the present disclosure, the object wave is not calculated every time depending on the positional variation of the object but the object wave is at first calculated in the entire space and thereafter, the position of the hologram plane is rigidly transformed by considering the relative position and rotation between the object and the hologram plane to rapidly read a value at the corresponding position.

The user's action needs to be directly reflected to the holographic image for the interaction between the user and the holographic image and to this end, the real-time hologram generation is required. As a generic technology for this, methods for rapidly generating computer-generated hologram (CGH) have been actively studied, but this primarily relates to low-resolution hologram and it is difficult to improve velocity with respect to a high-quality holographic image.

Therefore, in the present disclosure, even though simple interpolation is used by calculating the object wave in a volumetric data type in the entire space, high-resolution, high-quality hologram can be generated almost in real time, and basic rigid movement (translation and rotation) of the object is enabled in the interaction between the user and the holographic image by using the same.

Prior to describing the present disclosure in detail, terms used in the present disclosure will be first described.

The CGH as digital hologram generated by numerically simulating diffraction and interference phenomena of light is recorded in an interference pattern of the object wave and a reference wave. In this case, the object wave is a light wave generated from the surface of the object and the reference wave as a light wave to generate a hologram interference pattern generally adopts a plane wave.

Spherical wave is a light wave generated by a point source in space, whose wavefront has a spherical shape. A plane wave can be considered as a spherical wave whose source is in infinity and its wavefront is a plane.

Hereinafter, exemplary embodiments of the present disclosure will be described in detail with reference to the accompanying drawings.

Figure 2:
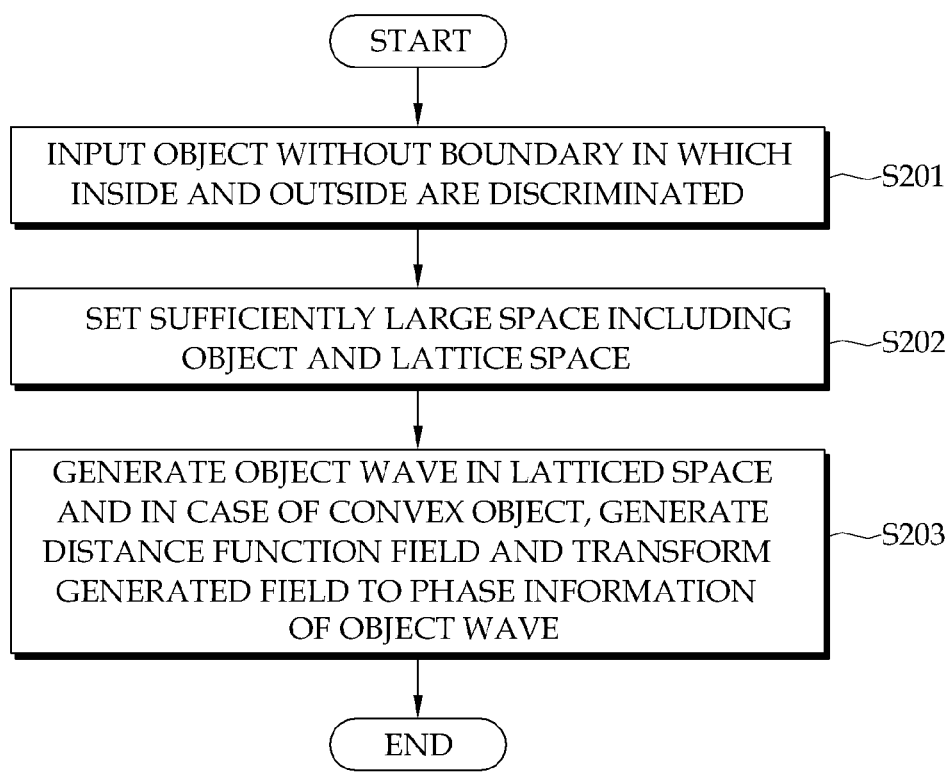
FIG. 2 is a flowchart illustrating a generation procedure of a volumetric data type object wave according to an exemplary embodiment of the present disclosure.

First, referring to FIGS. 1 and 2, an interaction procedure according to an exemplary embodiment of the present disclosure will be described. FIG. 1 is a flowchart illustrating an interaction processing procedure between a user and holographic image according to an exemplary embodiment of the present disclosure and FIG. 2 is a flowchart illustrating a generation procedure of a volumetric data type object wave defined in an entire space according to an exemplary embodiment of the present disclosure.

First, FIG. 1 will be described in detail.

Referring to FIG. 1, when a user performs a predetermined action with respect to holographic image (S101), the user's action may be captured by a method widely known in a computer vision such as a camera or an IR sensor. It may be calculated whether the user's action collides with an object associated with hologram through coordinate conversion between a user space and a hologram space. In this case, the user's action is transferred as force that acts on the object associated with the hologram through the coordinate conversion (S102). That is, an acting position, magnitude and direction of the force that acts on the object may be calculated from F=ma through velocity variation, an acting time of the user's action.

When the force that acts on the object is determined, the position and rotation of the object is changed by a rigid movement equation. In more detail, when the force that acts on the object is set as F, the following equation is induced.

$$m\frac{dv}{dt} = F \quad (1)$$

$$I\frac{d\Omega}{dt} = F \times r \quad (2)$$

The movement of the object is determined by time integration of the equation (S103). Herein, r represents a distance vector from a mass center of the object up to an acting point of the force, $\Omega$ represents an angular velocity of the object, and I represents moment of inertia. In this case, an area to limit the movement of the object needs to be set, and when a boundary of this area is set and the object is processed to rigidly collide, the object does not deviate from the limit area during interaction.

A hologram record of the object may be completely determined by relative geometric position and rotation between the object and a hologram plane (S104). By considering this point, calculation of relative position and rotation between object and hologram plane is enough to generate a new hologram for object transformed by user action and if the relative position and rotation between object and hologram plane is known together with object wave field defined on entire space, then it is not necessary to recalculate the object wave for an transformed object to update the hologram. Calculating the relative position and rotation between object and hologram plane is the same as expressing the holographic plane in terms of a local coordinate system of the object using the mass center of the object as the origin of the local coordinate system.

Hereinafter, all hologram plane coordinates in the local coordinate system using the mass center of the object as the origin are known. Then, a grid cell of a volumetric data space in which the object wave is defined is found with respect to all pixels of the hologram, and the amplitude and phase information of the object wave at a pixel position are calculated through trilinear interpolation. Thereafter, if the hologram has been updated for transformed object and a reconstruction wave is illuminated, a holographic image of the transformed object is displayed (S105).

Next, referring to FIG. 2, a procedure of generating a volumetric data type object wave will be described in detail.

First, as a condition of an object for calculating the object wave defined in the entire space, a boundary in which the inside and the outside are discriminated needs to be provided (S201). As a result, a sufficiently large space including the object, in which interaction is valid is set (S202). Thereafter, the space is latticed with appropriate resolution. In this case, the resolution may be determined by a wavelength of a used light wave. The object wave is defined at each lattice point, and phase and amplitude information of the object wave is calculated by an assumption that the initial phase of the object wave is zero. In this case, in the case of a convex object, phase information is determined by a distance function between a resolution grid point and the object and the amplitude of the object wave is determined as an energy conservation principle by an area variation of the level set surface of the distance function (S203).

Figure 3:
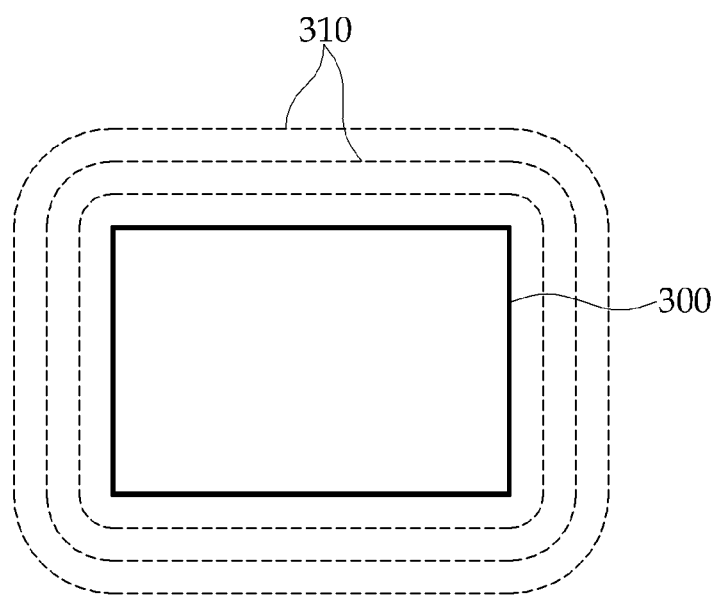
FIG. 3 is a diagram illustrating a wavefront of an object wave defined in a 2D space according to an exemplary embodiment of the present disclosure.

FIG. 3 is an example illustrating a light wavefront 310 of an object wave defined in a 2D space generated by user's action for an object 300.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for processing interaction between a user and hologram for user's action using a volumetric data type object wave field, the method comprising:
   generating a volumetric object wave field on a sufficiently large lattice domain;
   capturing user action on the holographic image of the object and solving collision between user and object;
   computing the updated position and rotation of the object by time integration of rigid body equation in collision;
   calculating the relative position and rotation of the hologram plane with respect to local object coordinates;

transforming the hologram in the pre-computed volumetric object wave field grid according to the relative position and rotation of the hologram plane in local object coordinates and reading the object wave fields at all the pixels of the transformed hologram plane in order to generate a new hologram for the transformed object caused by user action.

2. The method of claim 1, further comprising:

converting user action to force that acts on the object using velocity and acting time of user action after capturing user action to solve collision between user and object.

3. The method of claim 1, wherein:

in the calculating of updated position and rotation of the object, a fixed boundary area to limit movement of the object and the object forcibly collide with the fixed boundary area to limit the movement of the object.

4. The method of claim 1, wherein:

the generating of a new hologram for the transformed object caused by user action includes:

calculating the amplitude and phase information of the object wave at the pixel position of the transformed hologram plane through tri-linear interpolation of the pre-computed volumetric object wave field data.

5. The method of claim 4, wherein:

in the calculating of the phase information, in the case of a convex object in the latticed space, a distance function field is generated to be transformed to phase information of the object wave.

\* \* \* \* \*